F. E. FEY.
SPRING SUSPENSION.
APPLICATION FILED FEB. 27, 1919.
1,311,061.  
Patented July 22, 1919.
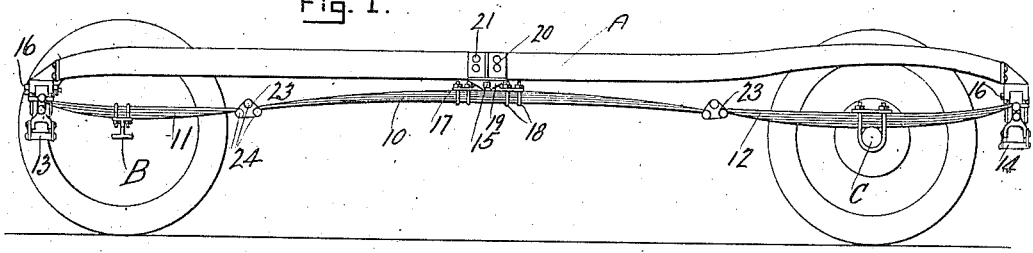
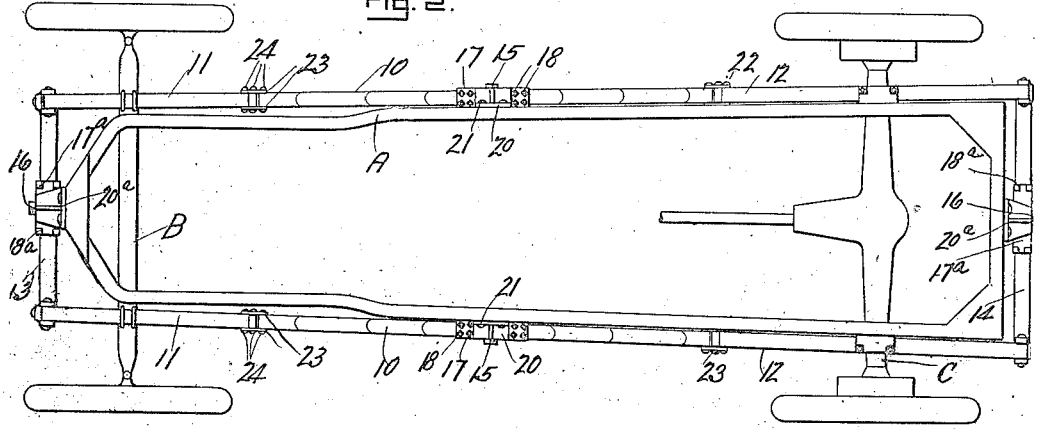
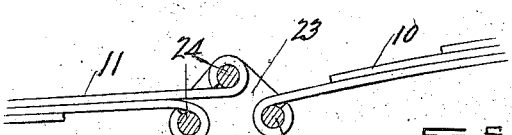
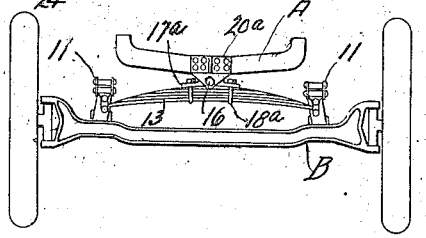
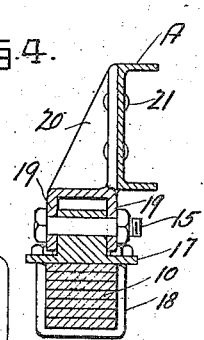
WITNESSES
INVENTOR  
Frank E. Fey  
BY  
ATTORNEYS

UNITED STATES PATENT OFFICE.

FRANK EDWARD FEY, OF PORTLAND, OREGON.

SPRING SUSPENSION.

1,311,061.    Specification of Letters Patent.    Patented July 22, 1919.

Application filed February 27, 1918. Serial No. 219,454.

*To all whom it may concern:*

Be it known that I, FRANK E. FEY, a citizen of the United States, and a resident of Portland, in the county of Multnomah and State of Oregon, have invented a new and Improved Spring Suspension, of which the following is a full, clear, and exact description.

My invention relates to spring suspension means for automobiles and other vehicles and more particularly relates to that tpye of suspension means involving a system of side springs between the front and the rear axles.

An object of the invention is to maximize the flexibility of the axle movement without disturbing the equilibrium of the frame and body to an appreciable degree.

A further object of the invention is to provide in a side spring involving front and rear springs and an intermediate spring, an improved connection between the intermediate spring and an adjacent side spring of a character to maintain the axle connected with said adjacent spring in alinement.

The stated objects and others will more clearly appear as the description proceeds.

Reference is to be had to the accompanying drawings forming a part of this specification in which similar reference characters indicate corresponding parts in all the views, it being understood that the drawings are merely illustrative of particular examples of the invention.

Figure 1 is a side elevation of a portion of a vehicle equipped with my improved spring suspension in one form of the invention;

Fig. 2 is a plan view thereof;

Fig. 3 is a fragmentary sectional side elevation of a connecting means between an end of the intermediate spring and the adjacent side spring;

Fig. 4 is a transverse vertical section on an enlarged scale taken at the pivot of the intermediate spring;

Fig. 5 is an end elevation of the invention as shown in Figs. 1 and 2.

In carrying out my invention I provide a system of side springs at each side of the frame and comprising a central spring 10, a front spring 11, to which the front axle B is secured, in this instance intermediate the ends of the spring, and a rear spring 12, to which the rear axle C is secured. The respective front springs 11 are connected at their front ends for which purpose I may employ as shown, a cross spring 13. Similarly, a cross spring 14 connects the rear ends of the rear axle springs 12. The intermediate springs 10 are pivotally connected at their centers with the frame by transverse pivots as at 15 and when the cross connections 13, 14 are employed as in Figs. 1 and 2, the same are connected with the frame by central pivots 16 disposed longitudinally of the vehicle. Any approved pivot means may be employed at 15, there being shown the pivot bolts passing through eye lugs 17 clipped to the spring 10 by U-bolts 18, the bolts passing also through parallel depending flanges 19 on brackets 20 secured to the frame A, as by rivets 21. Similarly, the end pivots 16 may consist as shown, of bolts passing through eye lugs 17$^a$ shackled to the springs 13, 14 by U-bolts 18$^a$, the bolts passing also through brackets 20$^a$, similar to the brackets 20. The central springs 10 are secured at their opposite ends to the adjacent ends of the front and rear axle springs 11, 12 in the manner as hereinafter further referred to.

With the described arrangement the pivoted center springs 10 increase the flexibility of axle movement and the four pivotal centers 15, 16 contribute to flexibility and maintain a sufficient stability, the central springs functioning as equalizers conjointly with their resilient action; and I obtain by the above described construction a complete cradle effect by reason of the "three-point" connection, that is, at the opposite pivotal connections 15 and front and rear pivotal end connections 16, the latter, as will be readily understood, serving to relieve the body and frame of all twisting strains either at the front or rear, the cradle effect being due to the pivotal allowance and the location of the side pivots 15 removed the maximum distance from the end conections 16. Thus, with either one of the four wheels in an unusually high position, the frame can maintain its equilibrium as will readily be apparent.

I illustrate in detail in Fig. 3 a form of spring connection which may be employed at the front end of the central spring, at the rear end of said spring, or at both ends, said connection being shown at both ends of the spring in the form of the invention illustrated in Figs. 1 and 2. As best seen in Fig. 3, an end of the spring 10 is clipped to the adjacent spring by triangularly located pivot points, the clips including side plates 23 joined by triangularly disposed bolts or rivets 24, the forward end of the spring 10 being secured to one fastener element 24 and the remaining two fastener elements 24 serving to separately secure at different elevations two leaves of the adjacent spring 11 or 12. Thus, in the triangular three-point spring connection, the two lower pins are at the base of the triangle and the third pin at the apex. The uppermost pin acts as a cantaliver beyond the lower pin (at the left of Fig. 3) to which the same spring is connected and carries the load imposed on the other lower pin (that at the right of Fig. 3) to which the other spring is connected; and the connection of the springs is dependent on all three pins in full occupancy of their respective functions to prevent collapse. The described connections between a central side spring and the adjacent front and rear springs is of prime importance owing to the employment of the end springs and pivotal end connections which would permit the axles to get out of alinement and which, if not counteracted, will result in setting in action a swaying motion of the whole structure; whereas the triangularly disposed three-point connection between the side springs while producing great flexibility in the spring system as a whole firmly resists the strains tending to throw the axles out of alinement and in the case of the rear axle the described connection thereof with the central spring produces the effect for which radius rods are ordinarily employed and which are eliminated by my improved construction.

I would state in conclusion that while the illustrated examples constitute practical embodiments of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A vehicle suspension means to produce a complete cradle effect in the suspension and prevent twisting of the frame due to the rising of either front wheel or either rear wheel, said means including springs for each side of the vehicle, the springs at each side comprising a front axle spring, a rear axle spring, and a separate central spring; cross connections at both the front and back of the vehicle between the respective front and rear axle springs, means to transversely pivot said central spring to the vehicle at the center of the spring, and means to centrally pivot each of said cross connections to the vehicle to rock on axes disposed longitudinally of the vehicle.

2. A vehicle suspension means to produce a complete cradle effect in the suspension and prevent twisting of the frame due to the rising of either front wheel or either rear wheel, said means including spring means for each side of the vehicle adapted to have support on the front and rear axles, transverse pivot means to connect the center of the spring means at each side with the vehicle, front and rear cross springs between the respective side spring means and connected therewith, and means to centrally pivot both of the cross springs on the vehicle on axes disposed longitudinally of the latter.

3. In a vehicle suspension means employing side springs comprising a central spring, centrally held to the vehicle, and front and rear axle springs respectively connected with the adjacent end of the central spring; means forming a connection between the central spring and an adjacent axle spring, and presenting triangularly disposed points of spring connection, two of said points of connection pertaining to one of the springs and being out of vertical alinement with each other, and the third point of connection being with the other spring, one of the first two points of connection being above the other two points, so that the two lower points of connection pertain to the respective springs.

4. In a vehicle suspension means employing side springs comprising a central spring centrally held to the vehicle, and front and rear axle springs respectively connected with the adjacent ends of the central spring; and means constituting the connecting medium between an end of the central spring and an axle spring and comprising clips having three triangularly disposed fastener elements, two of said fastener elements serving for the fastening of said axle spring at two points on the clip at different elevations and out of vertical alinement, and the third fastener element serving to secure the adjacent end of the central spring below the higher of said two connections.

5. In a vehicle suspension means, side springs for the rear axle of the vehicle, side springs in front of said axle springs, a cross spring connected with said axle springs and having means to centrally pivot the same on the vehicle, and means to connect the axle springs with the adjacent ends of the other side springs to constrain the axle springs to maintain the alined position of the rear axle, said last-mentioned means consisting of a three-point triangularly disposed connection between the said axle springs and the adjacent side springs, each of said connections embodying a two-point connection with one spring, at points out of vertical alinement, the third point of connection being with the adjacent spring.

FRANK EDWARD FEY.